United States Patent
Phillips et al.

(10) Patent No.: US 10,482,125 B1
(45) Date of Patent: *Nov. 19, 2019

(54) MUSIC PLAYLISTS FOR GEOGRAPHICAL REGIONS

(71) Applicant: Amazon Technologies, Inc., Seattle, WA (US)

(72) Inventors: Christopher Woolf Phillips, Berkeley, CA (US); Eric Scott Eisher, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 306 days.

This patent is subject to a terminal disclaimer.

(21) Appl. No.: 15/351,211

(22) Filed: Nov. 14, 2016

Related U.S. Application Data

(63) Continuation of application No. 14/229,707, filed on Mar. 28, 2014, now Pat. No. 9,495,447.

(51) Int. Cl.
| | |
|---|---|
| *G06F 16/638* | (2019.01) |
| *G06F 16/29* | (2019.01) |
| *G06F 16/68* | (2019.01) |
| *H04L 29/08* | (2006.01) |

(52) U.S. Cl.
CPC ............ *G06F 16/639* (2019.01); *G06F 16/29* (2019.01); *G06F 16/686* (2019.01); *H04L 67/306* (2013.01)

(58) Field of Classification Search
CPC ......... G06F 17/30749; G06F 17/30867; G06F 17/30053; G06F 17/30058; G06F 17/30743; G06F 17/30766; G06F 17/30772; G06F 17/3074; G06F 16/40; G06F 16/433; G06F 16/435; G06F 16/437; G06F 16/438; G06F 16/4387; G06F 16/60; G06F 16/635; G06F 16/637; G06F 16/638; G06F 16/639; G06F 16/687; G06F 16/29; G06F 16/686; G06F 16/587; G06F 16/65; G06F 16/535; H04H 60/47; H04H 60/33

See application file for complete search history.

(56) References Cited

U.S. PATENT DOCUMENTS

| | | | | |
|---|---|---|---|---|
| 6,587,127 | B1 * | 7/2003 | Leeke | G06Q 20/123 715/733 |
| 7,627,343 | B2 * | 12/2009 | Fadell | G06F 1/1632 439/222 |
| 2006/0235864 | A1 * | 10/2006 | Hotelling | G06Q 30/0601 |
| 2009/0158155 | A1 * | 6/2009 | Quinn | G06F 17/30743 715/716 |
| 2011/0034121 | A1 * | 2/2011 | Ng | H04L 67/06 455/3.06 |
| 2012/0059825 | A1 * | 3/2012 | Fishman | G06F 17/30053 707/737 |

(Continued)

*Primary Examiner* — Andrew C Flanders
(74) *Attorney, Agent, or Firm* — Thorpe North & Western, LLP.

(57) ABSTRACT

Technology is described for generating music playlists tailored to a geographical region. Collective music listening habits may be identified for a geographical region. The collective music listening habits for the geographical region may be categorized into one or more categories of music. Geographical station programming may be generated according to at least one of the categories of music. The geographical station programming may include a music playlist that corresponds to the collective music listening habits for the geographical region.

20 Claims, 8 Drawing Sheets

(56) References Cited

U.S. PATENT DOCUMENTS

| | | | |
|---|---|---|---|
| 2012/0072418 A1* | 3/2012 | Svendsen | G06F 17/30749 707/724 |
| 2013/0046755 A1* | 2/2013 | Svendsen | G06F 17/30749 707/722 |
| 2013/0122801 A1* | 5/2013 | Ingrassia | H04H 20/26 455/3.04 |

* cited by examiner

MUSIC PLAYLISTS FOR GEOGRAPHICAL REGIONS

This application is a continuation of U.S. patent application Ser. No. 14/229,707, filed on Mar. 28, 2014, which is incorporated herein by reference.

BACKGROUND

Music has traditionally played a significant role in society and culture. Music may be appreciated by users of all ages and nationalities. Music may be listened to at home, school, work, while traveling in a car or train, etc. Users may listen to music on a variety of electronic devices, such as terrestrial radios, satellite radios, handheld devices, tablet computers, televisions, desktop computers, etc. In some cases, the music may be stored on the electronic devices as digital media files or communicated to the electronic devices over a network.

Certain geographical regions may be known for a specific genre of music. For example, Nashville may be known for country music, Seattle may be known for grunge music and New Orleans may be known for jazz music. Therefore, users from Nashville may tend to listen to country music, users from Seattle may tend to listen to grunge music, users from New Orleans may tend to listen to jazz music, etc.

DETAILED DESCRIPTION

Figure 1:
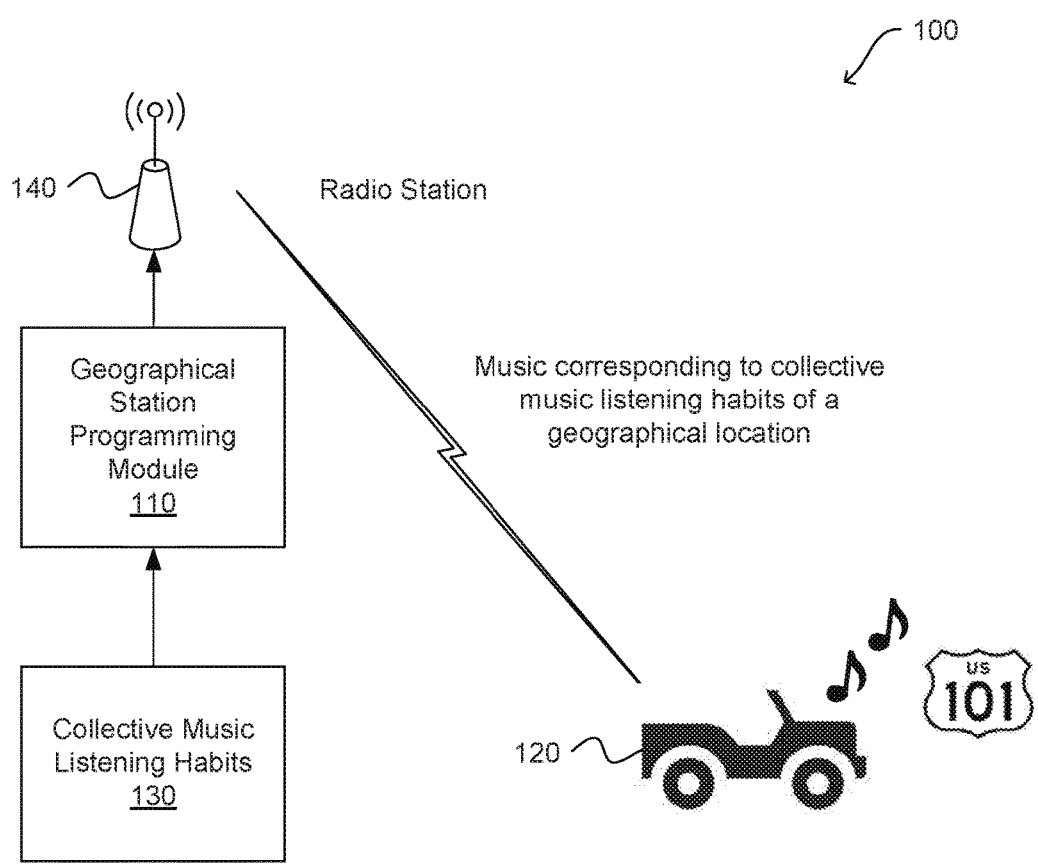
FIG. 1 illustrates a system and related operations for providing music over a terrestrial radio station according to a music playlist that is generated based on collective music listening habits of a geographical region according to an example of the present technology.

Technology is described for generating dynamic music playlists that are tailored to the collective music listening habits of a geographical region. The collective music listening habits may indicate music that is popular amongst users located within the geographical region. Therefore, users visiting the geographical region or residing in the geographical region may listen to a music playlist or geographical station programming that is representative of music that is popular in the geographical region. The geographical region may be defined by a geofence. In some examples, the geofence may be a zip code, an area surrounded by natural boundaries (e.g., a populace in a valley, on an island or in a canyon), a city or a region within the city (e.g., the northwest portion of the city).

Music-related behaviors performed by users in the geographical region may be collected and aggregated to form aggregated music behavior information. The aggregated music behavior information may include music purchases and music listened to via the internet (e.g., at electronic retail stores, via a networked application or via other electronic pages) by users located within the geographical region. The aggregated music behavior information may include music purchased and/or listened to at brick and mortar retail stores located within the geographical region. In addition, the aggregated music behavior information may include numerous types of music-related behaviors, such as discussions, reviews and/or recommendations of music on electronic pages created by users located within the geographical region.

The aggregated music behavior information may be analyzed in order to determine the collective music listening habits for the geographical region. For example, the aggregated music behavior information may be analyzed in order to determine patterns or similarities between the music-related behaviors performed by the users in the geographical location. The patterns or similarities in the aggregated information may identify the collective music listening habits for the geographical region. In other words, similar music-related behaviors may be clustered together and collective music listening habits may be inferred from a cluster of similar music-related behaviors. The collective music listening habits may identify particular artists, bands, songs, albums, or genres of music that are generally popular amongst users in the geographical region. For example, the aggregated music behavior information may indicate that, in a particular geographical region, 40% of music-related behaviors relate to alternative music, 35% of music-related behaviors relate to jazz music, 20% of music-related behaviors relate to country music, and 5% of music-related behaviors relate to miscellaneous music genres. Therefore, the collective music listening habits of the geographical region may indicate that users in the region predominantly listen to alternative, jazz and country music.

Geographical station programming may be generated for at least one genre of music. The geographical station programming may contain a music playlist with music that is representative of the collective music listening habits for the geographical region. The music playlist may contain music that was referenced in the aggregated music behavior information. For example, the music playlist may contain music that was purchased or listened to at an electronic retail store by users located within the geographical region. In addition, the music playlist may contain music that was talked about, reviewed, shared, recommended, etc. on electronic pages by users located within the geographical region. As an example, the collective music listening habits for the geographical region may numerically rank the most popular songs in the geographical region. A pop music playlist, a rock music playlist and a jazz music playlist may be generated when pop, rock and jazz are the most popular genres of music based on the numerical rank of the most popular songs in the geographical region.

The music may be provided according to the music playlist over a terrestrial radio station. In one example, the music may be provided to a radio transmitter and then broadcast over amplitude modulation (AM) radio channels or frequency modulation (FM) radio channels. The music may be received at a radio receiver (e.g., a radio alarm clock). In one configuration, the music may be received at a radio receiver coupled to a vehicle. As an example, a user may choose between radio stations that provide genres of music that are popular amongst users in the geographical region. For example, 98.3 may provide rock music, 98.5 may provide pop music, and 98.7 may provide jazz music. In general, 98.3, 98.5, 98.7, etc. may refer to radio stations that are broadcasting at a particular FM frequency.

Alternatively or additionally, the music may be provided according to the music playlist over a cellular network. For example, the music may be received at a mobile device via a cellular internet connection. In one particular configuration, the music may be received at a mobile device that is located within a vehicle. The mobile device may retransmit the music to the user's vehicle using a communication protocol, such as Bluetooth. Therefore, the user may easily listen to the music playlist using the vehicle's audio system while driving through the geographical region. In yet another example, the music may be provided according to the music playlist over a satellite radio station. The satellite radio stations may provide geographical station programming for specific geographic areas even if the satellite radio stations are available outside the geographic area.

In one example, the music in the music playlist being broadcast may vary depending on a time of day. The music playlist may contain music of the same genre, but may contain subtle variations within the genre. For example, 98.3 may provide rock music of a first variation in the morning, rock music with of a second variation in the afternoon, and rock music of a third variation in the evening. Alternatively, the music playlist may contain music from multiple genres based on the time of day. For example, 98.3 may provide pop music in the morning, jazz music in the afternoon, and rock music in the evening.

In one configuration, the user may listen to the music according to the music playlist and thereafter purchase the music via an electronic store. The user may log into a user account at an electronic store and select the geographical region of interest. For example, the user may select San Francisco. One or more radio channels may be associated with San Francisco. The user may select a radio channel (e.g., 98.5) and a time (e.g., Thursday or Thursday at 1 PM) that the radio channel was listened to by the user. A listing of the songs that were played on 98.5—San Francisco on Thursday may be provided to the user. The user may be able to purchase one or more of the songs from the listing of songs.

FIG. 1 illustrates a system 100 and related operations for providing music over a terrestrial radio station according to a music playlist that is generated based on collective music listening habits 130 of a geographical region. A vehicle 120 may be traveling on Route 101 in Southern California. A user within the vehicle 120 may desire to listen to music that is representative of music that is popular in Southern California. The user may tune into a radio channel (e.g., 98.1) that provides a music playlist of popular rock music for the Southern California area. A geographical station programming module 110 may generate the rock music playlist based on collective music listening habits 130 of users in the Southern California area. The collective music listening habits 130 may include aggregated information regarding rock music that was purchased or listened to at electronic retail stores by users in the Southern California area. The geographical station programming module 110 may broadcast, via a radio antenna 140 coupled to the geographical station programming module 110, the rock music playlist over the terrestrial radio station to a radio receiver within the vehicle 120. Therefore, the user inside the vehicle 120 may listen to rock music that is representative of the collective music listening habits for the Southern California area.

Figure 2:
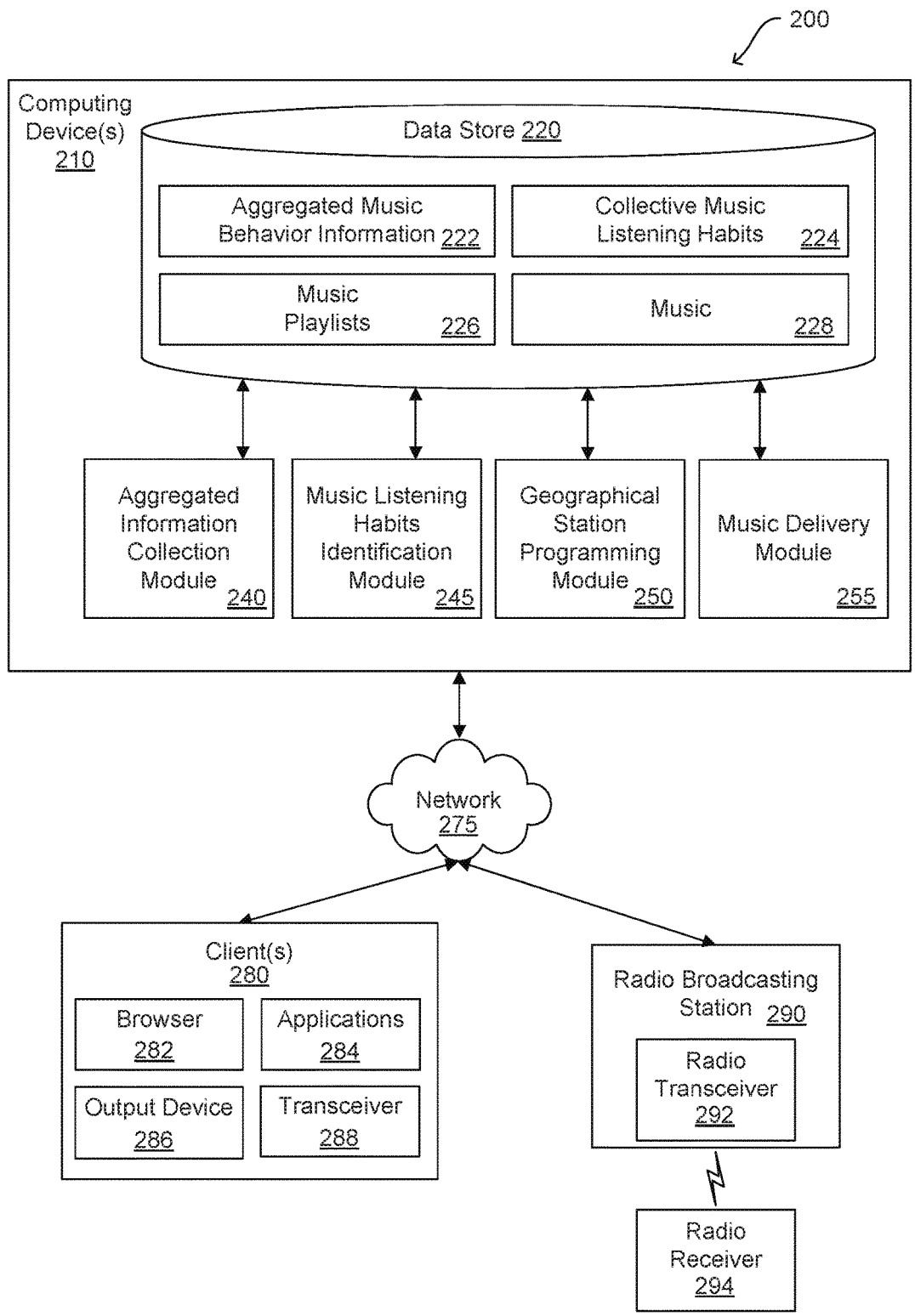
FIG. 2 is an illustration of a networked system for generating music playlists tailored to a geographical region according to an example of the present technology.

In the following discussion, a general description of an example system for generating music playlists tailored to a geographical region and the system's components are provided. The general description is followed by a discussion of the operation of the components in a system for the technology. FIG. 2 illustrates a networked environment 200 according to one example of the present technology. The networked environment 200 may include one or more computing devices 210 in data communication with a client 280 by way of a network 275. The network 275 may include the Internet, intranets, extranets, wide area networks (WANs), local area networks (LANs), wired networks, wireless networks, or other suitable networks, etc., or any combination of two or more such networks.

The client 280 is representative of a plurality of client devices that may be coupled to the network 275. The client 280 may comprise, for example, a processor-based system such as a computer system. Such a computer system may be embodied in the form of a desktop computer, a laptop computer, personal digital assistants, cellular telephones, smartphones, set-top boxes, network-enabled televisions, music players, tablet computer systems, game consoles, electronic book readers, or other devices with like capability. In one example, the client 280 may include a transceiver 288 to receive music according to a music playlist from the computing device 210 over the network 275 (e.g., cellular packet network). The computing device 210 may communicate the music according to the music playlist to the client 280 via a transceiver 288 in the client 280. Alternatively, the computing device 210 may provide the music according to the music playlist to a radio broadcasting station 290 over the network 275. The radio broadcasting station 290 may receive the music according to the music playlist from the computing device 210. The radio broadcasting station 290 may then transmit the music using the radio transceiver 292 according to the music playlist to a radio receiver 294 (e.g., a vehicle FM radio) over a terrestrial radio station.

Various applications and/or other functionality may be executed in the computing device 210 according to various embodiments. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, may be associated with the operation of the various applications and/or functional entities described below.

The data in the data store 220 may include aggregated music behavior information 222. The aggregated music behavior information 222 may be an aggregate of music-related behavior performed among a plurality of users located within a geographical region or geographical regions. The geographical region(s) may be defined by a geofence. The music-related behavior may include music purchased or listened to via the internet by users in the geographical region. For example, the music may be purchased or listened to at electronic retail stores or other electronic pages. In addition, the music may be added to an electronic music library and then streamed to client from that electronic music library.

The music-related behavior may include music listened to or purchased at brick and mortar retail stores by users in the geographical region. The music-related behavior may also include the most popular concerts or shows attended by users in the geographical region. Music-related behavior may include a time of day that the music is listened to or purchased. Further, music-related behavior may also include discussions, reviews, shares, recommendations, etc. of music on electronic pages (e.g., social media electronic pages) by users located within the geographical region. In one example, the music-related behavior may include users calling into a local radio station and requesting particular songs or songs from particular artists, thereby indicating music that is generally popular in the geographical region. In addition, users may call or text feedback (e.g., request) into a feedback system that may result in the geographical station programming being modified in response to the user input. Alternatively, the users may request the songs or provide other feedback to geographical station programming using an application running on a mobile computing device.

The data stored in the data store 220 may include collective music listening habits 224 for a plurality of geographical regions. The collective music listening habits 224 may represent music that is generally popular among users in a corresponding geographical region. The collective music listening habits 224 may be identified based on patterns or similarities in the aggregated music behavior information 222. In other words, the collective music listening habits 224 may identify particular artists, bands, songs, albums, music genres, etc. that are generally popular amongst users in the geographical region based on the aggregated music behavior information 222. The collective music listening habits 224 may be associated with a particular city or neighborhood. For example, the collective music listening habits 224 may represent music that is generally popular in the city of Portland. In one example, clusters of similar music-related behaviors, as indicated in the aggregated music behavior information 222, may be used to identify the collective music listening habits 224 for the geographical region.

The data stored in the data store 220 may include music playlists 226 for the geographical region. The music playlists 226 may be dynamically generated and updated based on the collective music listening habits 224 for the geographical region. The music playlists 226 may contain music that is popular among users in the geographical region. The music playlists 226 may be categorized according to genres of music that are generally popular in the geographical region. For example, the music playlists 226 may include a rock music playlist, a pop music playlist, a classical music playlist, and so on. The music playlists 226 may include music that was identified or referenced in the aggregated music behavior information 222. In other words, the music playlists 226 may contain music that was purchased, listened to, written about, shared, recommended, reviewed, etc. by users in the geographical region. In one example, the music playlists 226 may change as a result of variations in the collective music listening habits 224 for the geographical region.

The data stored in the data store may include music 228. The music 228 may include music that is generally popular in a particular geographical region. In other words, the music 228 may include music that corresponds with the collective music listening habits 224 for the geographical region. The music 228 may span a plurality of musical genres, such as pop, rock, jazz, country, metal, classical, foreign, etc. The music 228 may be composed and/or performed by a plurality of musicians and/or bands. The music 228 may be periodically updated based on variations in the collective music listening habits 224 for the geographical region. In addition, the music 228 may be broadcasted over various types of networks, such as cellular networks or terrestrial radio. In one example, the music 228 may be received from music record companies or directly from the artists.

The components executed on the computing device 210 may include an aggregated information collection module 240, a music listening habits identification module 245, a geographical station programming module 250, a music delivery module 255, and other applications, services, processes, systems, engines, or functionality not discussed in detail herein. One or more of the modules 240, 245, 250, and 255 may be included on a computing device associated with a third party. In addition, the modules 240, 245, 250, and 255 may be included on one or more computing devices that are located in separate geographical locations or in separate computing devices that are co-located.

The aggregated information collection module 240 may be configured to collect and aggregate information related to music-related behaviors performed by users in a geographical region. The aggregated information collection module 240 may collect data about music purchases and music listened to via the internet (e.g., at electronic retail stores or other electronic pages) by users located within the geographical region. The aggregated information collection module 240 may identify a time of day that the music was purchased or listened to by the users. The aggregated information collection module 240 may collect data about music purchases and music listened to in brick and mortar retail stores located within the geographical region. In addition, the aggregated information collection module 240 may identify music discussions, reviews, recommendations, and other music-related behaviors performed by users on electronic pages within the geographical region.

The music listening habits identification module 245 may be configured to identify collective music listening habits for the geographical region using the aggregated music behavior information 222. The collective music listening habits may represent music that is popular in the geographical region according to the aggregated music behavior information 222. The music listening habits identification module 245 may analyze the aggregated music behavior information 222 to determine patterns or similarities between the music-related behaviors performed by users in the geographical location. The patterns or similarities in the aggregated information may identify the collective music listening habits for the geographical region. The collective music listening habits may identify particular artists, bands, songs, albums, genres of music, etc. that are generally popular amongst users in the geographical region. For example, the music listening habits identification module 245 may identify that jazz, pop and rock music are the most popular types of music in the geographical region based on the aggregated music behavior information 222.

The geographical station programming module 250 may be configured to generate a music playlist for at least one category of music based on the collective music listening habits for the geographical region. In one example, the category of music may include a genre of music. Therefore, the music playlist may be for a genre of music that is popular among users in the geographical region. The geographical station programming module 250 may generate the music playlist which includes music that is referenced in the aggregated music behavior information 222. For example, the music playlist may contain music that was purchased or listened to at an electronic retail store by users located within the geographical region. In addition, the music playlist may contain music that was written about, reviewed, shared, recommended, etc. on electronic pages by users located within the geographical region. For example, the collective music listening habits for the geographical region may indicate that pop, rock and jazz are the most popular genres of music, respectively. Therefore, the geographical station programming module 250 may generate a pop music playlist, a rock music playlist and a jazz music playlist.

The music delivery module 255 may be configured to provide the music from the music playlist to the client 280 over the network 275. Alternatively, the music delivery module 255 may provide the music from the music playlist to a radio receiver 294 via the radio broadcasting station 290. The music may be provided to the radio receiver 294 over a radio frequency, such as an amplitude modulated (AM) radio frequency or a frequency modulated (FM) radio frequency. In one configuration, the music delivery module 255 may provide the music to the radio receiver 294 via the radio broadcasting station 290 over a plurality of radio frequencies. For example 91.3 FM may provide a jazz music playlist, 91.5 FM may provide a pop music playlist, and 91.7 FM may provide a rock music playlist. Furthermore, the music delivery module 255 may provide the music from the music playlist to a mobile computing device over a cellular network. The mobile computing device may include, but is not limited to, a mobile phone, tablet computer, laptop computer, etc. In one example, the music may be provided to the mobile computing device upon a music application being installed on the mobile computing device and configured to receive the music from the music delivery module 255. In yet another example, the music delivery module 255 may provide the music to a satellite radio receiver via a satellite radio station.

In addition, the music delivery module 255 may provide the music according to the music playlist over the radio broadcasting station 290 while simultaneously providing music according to the same music playlist (i.e., a copy of the music playlist) over the cellular data network. For example, an identical music playlist of songs 1 to 100 may be simultaneously provided over the radio broadcasting station 290 and the cellular data network.

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The computing device 210 may comprise, for example, a server computer or any other system providing computing capability. Alternatively, a plurality of computing devices 210 may be employed that are arranged, for example, in one or more server banks, computer banks or other computing arrangements. For example, a plurality of computing devices 210 together may comprise a clustered computing resource, virtualization server, a grid computing resource, and/or any other distributed computing arrangement. Such computing devices 210 may be located in a single installation or may be distributed among many different geographical locations. For purposes of convenience, the computing device 210 is referred to herein in the singular. Even though the computing device 210 is referred to in the singular, it is understood that a plurality of computing devices 210 may be employed in the various arrangements as described above.

The client 280 may be configured to execute various applications such as a browser 282, and/or other applications 284. The applications 284 may correspond to code that is executed in the browser 282 (e.g., web applications). The applications 284 may also correspond to standalone applications, such as networked applications. In addition, the client 280 may be configured to execute applications 284 that include, but are not limited to, video playback applications, standalone applications, email applications, instant message applications, and/or other applications.

The client 280 may include or be coupled to an output device 286. The browser 282 may be executed on the client 280, for example, to access and render network pages (e.g. web pages) or other network content served up by the computing device 210 and/or other servers. The output device 286 may comprise, for example, one or more devices such as cathode ray tubes (CRTs), liquid crystal display (LCD) screens, gas plasma-based flat panel displays, LCD projectors, or other types of display devices, etc. In addition, the output device 286 may include an audio device, tactile device (e.g., braille machine) or another output device to feedback to a user.

Figure 3:
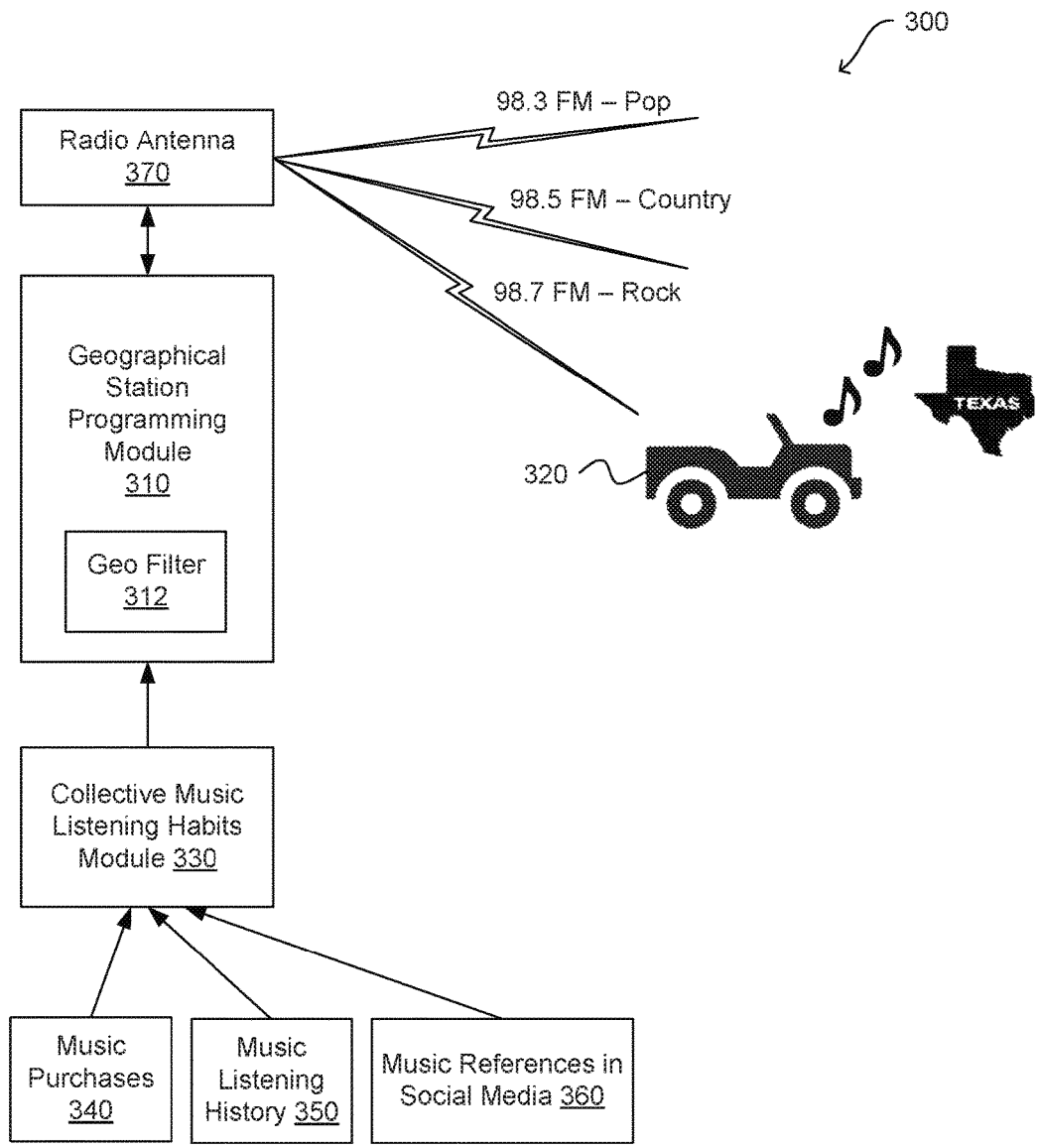
FIG. 3 illustrates a system and related operations for providing music over a terrestrial radio station according to a plurality of music playlists that are generated based on collective music listening habits of a geographical region according to an example of the present technology.

FIG. 3 illustrates a system 300 and related operations for providing music according to a plurality of music playlists that are generated based on collective music listening habits of a geographical region. The geographical region may include a city, a portion of a city (e.g., a southwest area of a city), a neighborhood, etc. A collective music listening habits module 330 may determine collective music listening habits for the geographical region. The collective music listening habits module 330 may determine the collective music listening habits for the geographical region using aggregated music behavior information related to music purchases 340, a music listening history 350 and/or music references in social media 360, for example. The music purchases 340 may include music purchased at electronic retail stores and/or brick and mortar stores by users located in the geographical region. The music listening history 350 may include music listened to on electronic pages and/or via electronic applications by users located in the geographical region. The music references in social media 360 may include references to music in social media, such as discussions, recommendations, reviews, posts, blogs, messages, etc. related to music by users located in the geographical region. Therefore, the collective music listening habits module 330 may identify a plurality of artists, songs, bands, albums, genres, etc. that are generally liked and listened to by users in the geographical region.

In one example, the geographical region may be defined according to a geofence. The dimensions of the geofence may be hand-programmed and/or automatically determined and adjusted using the aggregated music behavior information. For example, the aggregated music behavior information may indicate that users in a southern region of a city generally like hip hop music and users in a northern region of the city generally like jazz music. Therefore, the city may be divided into two distinct geofences—a first geofence surrounding the southern region of the city and a second geofence surrounding the northern region of the city.

The collective music listening habits module 330 may provide the collective music listening habits for the geographical region to a geographical station programming module 310. The geographical station programming module 310 may generate one or more music playlists containing music that corresponds with the collective music listening habits for the geographical region. The music playlists may be dynamically created and modified based on the collective music listening habits for the geographical region. The music playlists may be periodically adjusted to include a variety of songs. The music playlists may contain one or more promotional songs for a temporary period of time and depending on the popularity of the promotional songs may be included in the collective music listening habits for the geographical region. In addition, a frequency that a particular song is included in the music playlist may correlate to a popularity of the particular song, as evidenced by the aggregated music behavior information for the geographical region. Therefore, a song may be included in the music playlist a fewer number of times as the song decreases in popularity, and vice versa.

The geographical station programming module 310 may generate each music playlist for a particular genre of music. For example, collective music listening habits may indicate that pop, country and rock are the most popular genres of music in the geographical region. Therefore, the geographical station programming module 310 may generate a pop music playlist containing pop music, a country music playlist containing country music, and a rock music playlist containing rock music. The music playlists may include music that is identified or referenced in the music purchases 340, music listening history 350 and music references in social media 360. In one example, the number of music playlists generated by the geographical station programming module 310 may correspond to the most popular music genres in the geographical region. For example, the collective music listening habits module 330 may determine, based on the aggregated music behavior information, that classical music comprises 40% of music-related behaviors performed in the geographical region, world music comprises 35% of music-related behaviors performed in the geographical region, and adult contemporary comprises 20% of music-related behaviors performed in the geographical region. Therefore, the geographical station programming module 310 may generate a classical music playlist, a foreign music playlist and an adult contemporary music playlist because classical, world and adult contemporary, respectively, are the most popular music genres in the geographical region.

Alternatively, the geographical station programming module 310 may generate a new music playlist when a number of users being interested in a particular genre of music exceed a predetermined threshold. For example, an indie rock music playlist may be generated when at least 10,000 users in the geographical region indicate an interest in rock music based on the music-related behaviors performed in the geographical region. In another example, the indie rock music playlist may be generated when at least 10% of music-related behavior performed in the geographical region is related to the indie rock music.

In yet another example, while music playlists may be constructed based on songs, artist purchase and playback frequency activity in a geographical region, artist music playlists, theme-based music playlists, genre-based music playlists and mood-based music playlists may be algorithmically created. These music playlists may source and feed the geographical station programming. Therefore, a plurality of users may listen to the music playlists via electronic pages that may surface into the geographical station programming.

In one configuration, the geographical station programming module 310 may broadcast the music according to the music playlists over a terrestrial radio station. The geographical station programming module 310 may broadcast the music playlists via a radio antenna 370 that is coupled to the geographical station programming module 310. The music may be provided to a radio transmitter and then broadcasted over an amplitude modulation (AM) radio channel or a frequency modulation (FM) radio channel. In one example, AM radio signals may be broadcasted at a frequency ranging from 535 kilohertz to 1,700 kilohertz and FM radio signals may be broadcasted at a frequency ranging from 88 megahertz and 108 megahertz. The music broadcasted over the terrestrial radio station may be received at a radio receiver in a vehicle 320.

In one configuration, the collective music listening habits module 330 may determine collective listening habits for a plurality of geographical regions (e.g., the west coast of the United States) based on the music purchases 340, music listening history 350 and music references in social media 360 according to the plurality of geographical regions. Thus, geographical station programming can be created for a region.

The geographical station programming module 310 may include a geo filter 312 that identifies collective music listening habits for a particular geographical region (e.g., San Francisco or Boston) when creating the music playlist. In other words, the geo filter 312 may identify popular music in a particular region and enable the geographical station programming module 310 to create music playlists for geographical station programming using music that is popular in that particular region.

For example, the geographical station programming module 310 may create a generic Saint Patrick's Day music playlist to be provided to users nationwide. In addition, the geographical station programming module 310 may create a first tailored Saint Patrick's Day music playlist, using the geo filter 312, so that the first tailored music playlist corresponds to the collective music listening habits of users in a first region (e.g., Seattle). Further, the geographical station programming module 310 may create a second tailored Saint Patrick's Day music playlist, using the geo filter 312, so that the second tailored music playlist corresponds to the collective music listening habits of users in a second region (e.g., Dallas). As another example, the geographical station programming module 310 may create a generic music playlist for a particular artist, and using the geo filter 312, create tailored music playlists with music from that particular artist corresponding to collective music listening habits for a plurality of geographical regions. As yet another example, the geographical station programming module 310 may create a generic music playlist containing a top 100 pop songs, and using the geo filter 312, create tailored top 100 pop music playlists that reflect particular pop songs that are popular in different geographical regions.

In one example, the geographical station programming module 310 may broadcast the music playlists over multiple radio channels. Thus, the vehicle 320 may receive music in a certain category or area that is representative of the collective music listening habits of the geographical region that the vehicle 320 is currently traveling in. For example, the vehicle 320 may be traveling in Texas and a user within the vehicle 320 may turn to a radio channel that provides music in a certain category that is representative of the collective music listening habits of a city in Texas. However, the vehicle 320 may be unable to receive music that is representative of collective music listening habits in New York City over the radio station when the vehicle 320 is traveling in Texas.

In one configuration, the geographical station programming module 310 may broadcast a tag along with the music in the music playlist. The tag may provide a song's name, artist, genre, and other types of information associated with the song. A radio receiver in the vehicle 320 may include a display screen to display the song's name, artist or genre to a user inside the vehicle 320.

In one example, the music in the music playlist may vary depending on a time of day based on the collective music listening habits of users in the geographical region. The music may vary depending on whether the music is being broadcasted in the morning, afternoon, during rush hour, evening, night, etc. As an example, the collective music listening habits module 330 may determine that users listen to various types of pop music depending on the time of day. Therefore, the geographical station programming module 310 may broadcast pop music according to a pop music playlist that contains subtle variations based on the time of day. For example, the geographical station programming module 310 may broadcast the pop music according to a pop music playlist that contains children's pop music in the morning, edgier pop music for adults during the work day, relaxing-sounding pop music during rush hour, and romantic pop music in the evening. In another configuration, the geographical station programming module 310 may broadcast pop music in the morning, rock music in the afternoon and jazz music in the evening.

In one configuration, the geographical station programming module 310 may broadcast the music to the vehicle 320 over a first terrestrial radio channel. Then the vehicle 320 may detect that the vehicle 320 is approaching an adjacent geographical region using a global positioning system or other location sensor system. The vehicle 320 may provide an announcement to a user within the vehicle 320 to switch to a second terrestrial radio channel when the vehicle 320 approaches the adjacent geographical region, wherein the second terrestrial radio channel may provide the same genre of music as the first terrestrial radio channel. For example, the vehicle 320 may be receiving music according to a country music playlist on 95.5 FM while driving in Fort Worth, Tex. Thereafter, the vehicle 320 may approach a geographical region associated with Dallas, Tex. The vehicle 320 may provide the announcement when the vehicle 320 approaches Dallas, wherein the announcement informs the user within the vehicle 320 to switch over to 101.5 FM to continue listening to country music. In addition, the announcement may inform the user that 101.5 FM may be representative of country music that is generally liked by residents in the area of Dallas.

Figure 4:
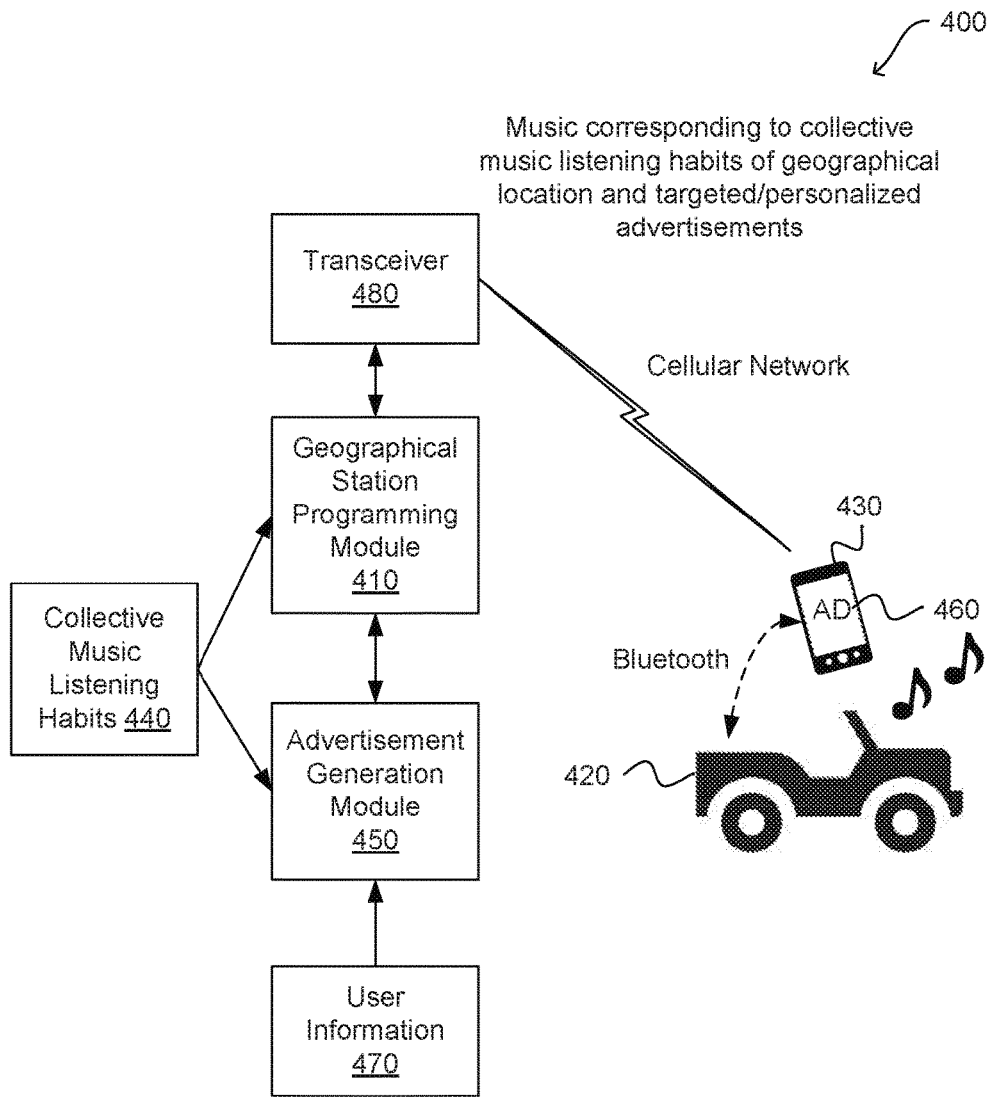
FIG. 4 illustrates a system and related operations for providing music over a cellular network according to a music playlist that is generated based on collective music listening habits of a geographical region according to an example of the present technology.

FIG. 4 illustrates a system 400 and related operations for providing music over a cellular network according to a music playlist that is generated based on collective music listening habits 440 of a geographical region. A geographical station programming module 410 may generate one or more music playlists containing music that corresponds with the collective music listening habits 440 for the geographical region. The geographical station programming module 410 may broadcast the music, via a transceiver 480, according to the music playlist over a cellular network. The music may be received at a plurality of device types, such as a mobile computing device 430.

In one example, the mobile computing device 430 may request music that is representative of the collective music listening habits of a particular geographic area where the mobile computing device 430 is located. Alternatively, the mobile computing device 430 may request music that is representative of the collective music listening habits of a particular geographic area where the mobile computing device 430 is not located. The mobile computing device 430 may request the music that is representative of the geographic area via a music application that is installed on the mobile computing device 430. As an example, the mobile phone 430 may be located within the state of Texas and request, via the music application, music that is representative of the collective music listening habits of users in Texas. Alternatively, the mobile computing device 430 may be located within the state of Texas and request, via the music application, music that is representative of the collective music listening habits of users in Utah.

In another configuration, the mobile computing device 430 may request music according to a music playlist that is representative of the collective music listening habits of a larger particular geographical region (e.g., all of Texas or all of the west coast). The geographical station programming module 410 may provide the music according to a music playlist to the mobile computing device 430. The mobile computing device 430 may be located in proximity to a vehicle 420 or may be located within the vehicle 420. Therefore, the mobile computing device 430 may retransmit the music received from the geographical station programming module 410 to a radio receiver in the vehicle 420. The mobile computing device 430 may retransmit the music using a variety of communication protocols, such as Bluetooth, near field communication (NFC), Wi-Fi, etc. Therefore, a user within the vehicle 420 may conveniently listen to music that is provided to the mobile computing device 430 using a stereo system of the vehicle 420.

In one example, an advertisement generation module 450 may generate advertisements 460 for the mobile computing device 430. The advertisements 460 may be generated based on the collective music listening habits 440 of the geographical region associated with the mobile computing device 430. In other words, the advertisements 460 may be sourced locally (i.e., sourced from the geographical region associated with the mobile computing device 430). The collective music listening habits 440 may provide the interests or affinities of users in the geographical region with respect to certain products or services. For example, users in Dallas that listen to country music may purchase certain types of items with a higher frequency (e.g., oil changes, car washes, gym memberships), whereas users in Dallas that listen to pop music may purchase other types of items with a higher frequency (e.g., manicures, beauty products). Therefore, the advertisement generation module 450 may generate advertisements 460 based on known group characteristics of users in the geographical region. The advertisement generation module 450 may provide the advertisements 460 to the geographical station programming module 410, which in turn may broadcast the advertisements 460 to the mobile computing device 430 over the cellular network.

Alternatively, the advertisement generation module 450 may generate advertisements 460 that are personalized for a user associated with the mobile computing device 430. The advertisement generation module 450 may generate the advertisements 460 based on user information 470 or user profiles. The user information 470 may include account information, product purchase history, product viewing history and/or a listening history of the user associated with the mobile computing device 430. The advertisement generation module 450 may provide the advertisements 460 to the geographical station programming 410, which in turn may broadcast the personalized advertisements 460 to the mobile computing device 430 over the cellular network.

Figure 5:
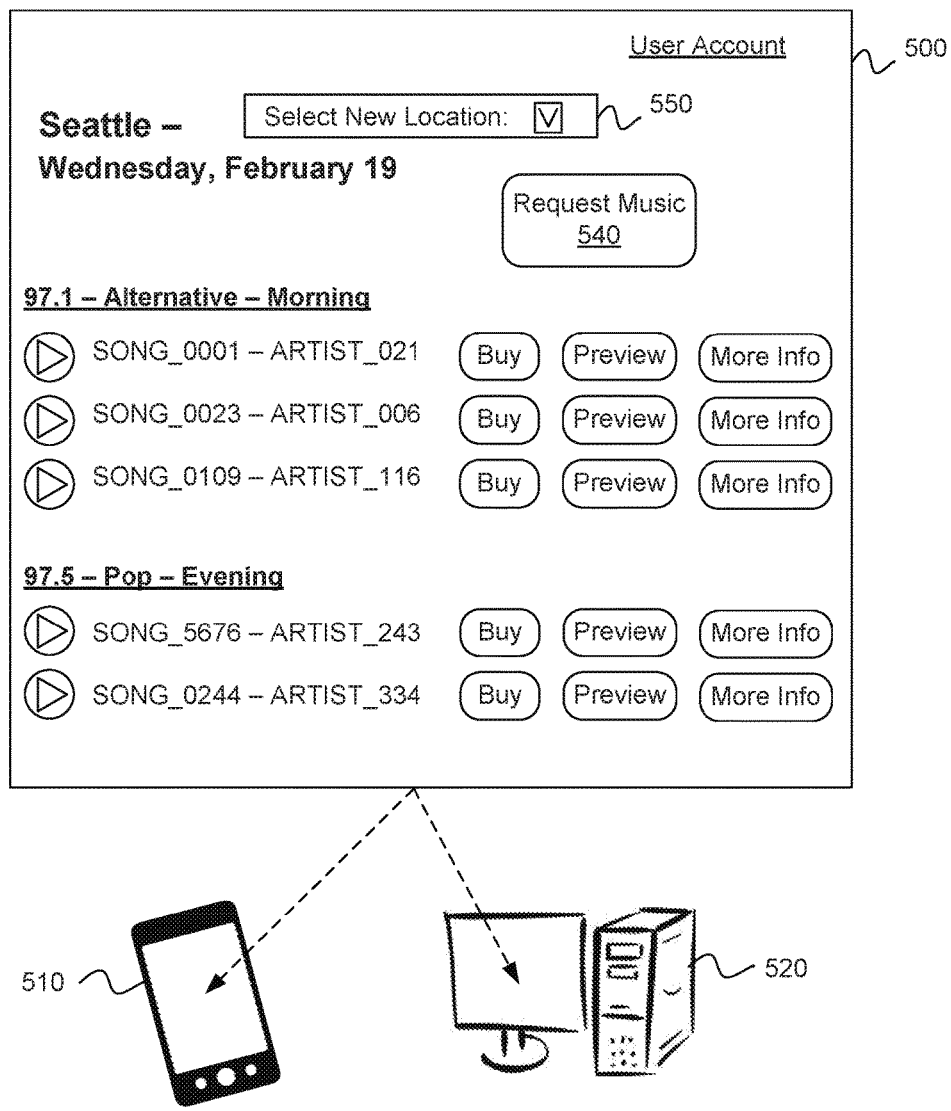
FIG. 5 illustrates a user interface for accessing information about music playlists that were generated based on the collective music listening habits of a geographical region according to an example of the present technology.

FIG. 5 illustrates a user interface 500 for accessing information about music playlists that were provided in a geographical region. The user interface 500 may be accessed via an electronic page or electronic application. The user interface 500 may be accessed on a plurality of computing devices, such as a mobile phone 510 or a desktop computer 520. In one configuration, users may be informed of the user interface 500 from advertisements included in the music playlists. For example, the advertisements may inform the users that the songs included in the music playlists may be purchased or listened to on the user interface 500 upon logging into a user account. In addition, the advertisements may inform the users that a listing of songs previously broadcast may be viewed on the user interface 500 upon the user accessing an electronic page and selecting a geographical region of interest.

In one example, a user may access the user interface 500 on the mobile phone 510 via a music application installed on the mobile phone 510. The user may access the user interface 500 while the mobile phone 510 is receiving music over a cellular network. The music interface 500 may allow the user to view information about songs that are currently being received at the mobile phone 510 over the cellular network (not shown in FIG. 5), purchase songs, add songs to a music library and/or access additional information about songs. In addition, the music interface 500 may allow the user to purchase songs, listen to songs, preview songs or request additional information about songs that were recently received at the mobile phone 510 and/or were included in the music playlist at an earlier time.

In another example, the user may access the user interface 500 on the desktop computer 520 via an electronic page. The user may access the user interface 500 by logging into a user account after hearing music broadcast over a terrestrial radio channel. The user may select a particular geographical region that is of interest to the user. For example, the user may have been listening to music playlists in the geographical region earlier in the day. The user interface 500 may provide a list of radio channels that are associated with the geographical region selected or entered by the user. Each radio channel may include a listing of songs that were provided during a particular day and time frame. The user interface 500 may allow the user to perform a variety of actions with respect to the listing of songs. For example, the user may buy a song, preview a song and/or access supplemental information about the song. The supplemental information may include song information, artist information, related music, song lyrics, reviews, etc. In addition, the user may select an alternative geographical region 550 and view the list of radio channels associated with the alternative geographical region. Therefore, the user may view songs that are popular in, for example, Los Angeles, Portland and Salt Lake City.

As an example, a user may have listened to alternative music on 97.1 FM during a morning commute in Seattle. The user may desire to listen to one of the songs that was heard in the morning, but does not know the song name or artist. The user may access their user account and select "Seattle" as the geographical region of interest. In addition, the user may specify the day (e.g., Wednesday, February 19) and a time of day (e.g., morning). A list of radio channels in Seattle may be shown in the user interface 500. The user may view a listing of songs that were broadcasted on 97.1 in the morning. The user may access options to buy one or more of the songs, preview the songs and/or request more information about the songs.

In one configuration, the user interface 500 may include an option for the user to request music 540. For example, the user may request a particular song or music from a particular artist via the user interface 500. The user may request the music for geographical station programming associated with a particular city (e.g., 97.1 in Seattle). The user may receive a reply message including an estimated time frame for when the requested music is to be provided over the geographical radio station. In addition, the user may provide feedback, via the user interface 500, related to the music being provided via the geographical radio station. The user's feedback may result in the geographical station programming being modified to better represent the music that is popular in the geographical region.

Figure 6:
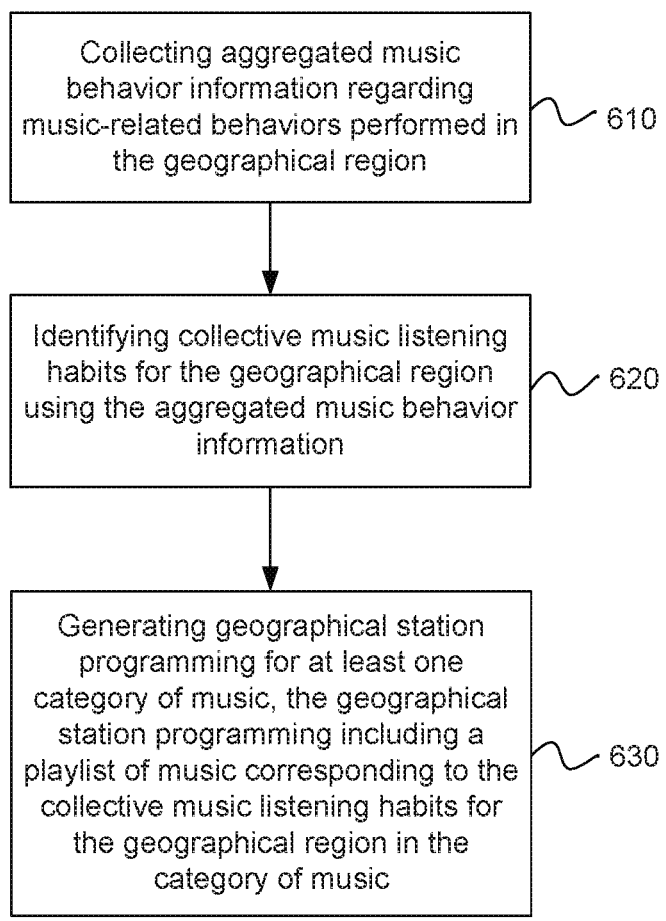
FIG. 6 is a flowchart of an example method for generating music playlists tailored to a geographical region.

FIG. 6 illustrates an example of a method for generating music playlists tailored to a geographical region. Aggregated music behavior information regarding music-related behaviors performed in the geographical region may be collected, as in block 610. The aggregated music behavior information may include electronic music purchases and music listened to via the internet by users located within the geographical region. In addition, the aggregated music behavior information may include other types of music-related behaviors, such as discussing, reviewing, sharing and/or recommending music on electronic pages by users located within the geographical region.

The collective music listening habits for the geographical region may be identified using the aggregated music behavior information, as in block 620. The collective music listening habits may be identified by determining similarities or patterns in the aggregated music behavior information. In other words, the similarities or patterns in the aggregated music behavior information may indicate music that is generally liked by users in the geographical region. The collective music listening habits may identify particular artists, bands, songs, albums, genres of music, etc. that are generally liked by users in the geographical region.

Geographical station programming may be generated for at least one category of music, as in block 630. In one example, the category of music may include a genre of music. The geographical station programming may include popular music according to the collective music listening habits for the geographical region. In other words, the geographical station programming may include a music playlist of popular music identified based on the aggregated music behavior information. In one example, the geographical station programming may be provided to a radio transmitter for transmission over a terrestrial radio station. Additionally or alternatively, the geographical station programming may be provided to a transceiver for communication to a computing device over a cellular network.

Figure 7:
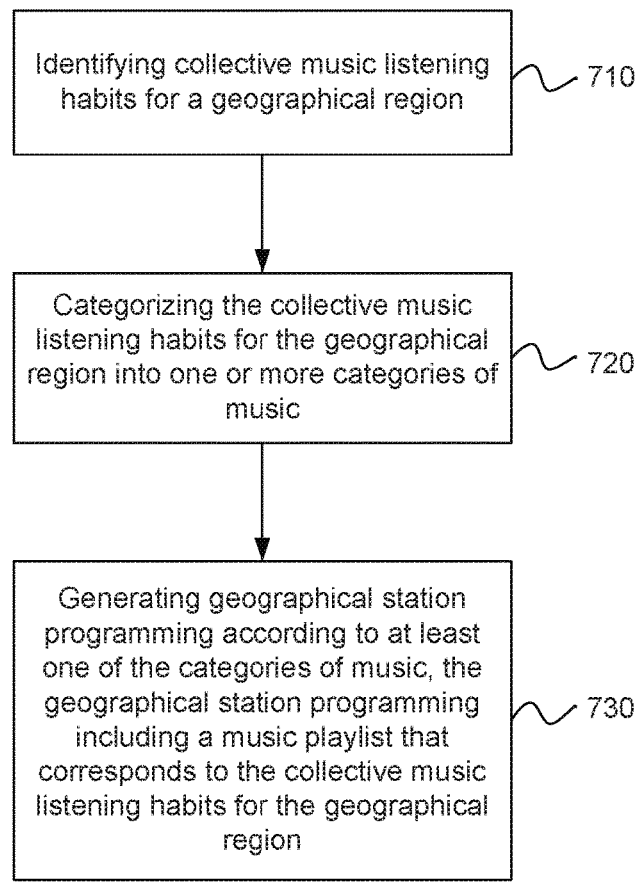
FIG. 7 is a flowchart of another example method for generating music playlists tailored to a geographical region.

FIG. 7 illustrates an example of a computer implemented method for generating music playlists tailored to a geographical region. Collective music listening habits may be identified for a geographical region, as in block 710. The collective music listening habits may indicate particular artists and/or songs that are generally popular among users in the geographical region. In one example, the collective music listening habits for the geographical region may be identified based on aggregated information about music items purchased or listened to at an electronic site by users located within the geographical region. In addition, the collective music listening habits may be identified based on music that is shared, discussed, reviewed, recommended, etc. on electronic pages by users located in the geographical region.

The collective music listening habits for the geographical region may be categorized into one or more categories of music, as in block 720. In other words, the particular artists and/or songs generally liked in the geographical region may be associated with the one or more categories of music. For example, the pop songs may be categorized into a pop category, the country songs may be categorized into a country category, and so on. In one example, the categories of music may include genres of music.

Geographical station programming according to at least one of the categories of music may be generated, as in block 730. The geographical station programming may include a music playlist containing music that corresponds to the collective music listening habits for the geographical region. For example, a pop music playlist may be generated containing popular pop songs, a country music playlist may be generated containing popular country songs, and so on.

In one example, the geographical station programming may be provided over a terrestrial radio station. Additionally or alternatively, the geographical station programming may be provided over a cellular network. In one example, the geographical station programming may be provided to a mobile device over a cellular network, wherein the mobile device is capable of retransmitting the geographical station programming to a vehicle. In addition, the geographical station programming may be varied according to a time of day based on the collective music listening habits for the geographical region.

In one configuration, the music contained in the geographical station programming may be offered for purchase upon a user logging into a user account and selecting the geographical region associated with the user. In addition, information about the music contained in the geographical station programming may be provided upon a user selecting the geographical region associated with the user.

In one example, targeted advertisements may be provided with the geographical station programming based on the collective music listening habits for the geographical region. In addition, personalized advertisements may be provided to a mobile device that are personalized for a user based on a viewing history, purchasing history, listening history or account information associated with the user. The targeted advertisements and the personalized advertisements may be provided over a terrestrial radio station and/or a cellular network.

In one configuration, the geographical station programming may be provided to a vehicle in the geographical region over a first terrestrial radio channel. An announcement may be subsequently provided for a user to switch to a second terrestrial radio channel when the vehicle approaches an adjacent geographical region, wherein the second terrestrial radio channel provides a same genre of music as the first terrestrial radio channel. In other words, an announcement may be provided, by the vehicle, to a user when the user approaches a neighboring geographical region. The announcement may inform the user to switch to a different radio channel in order to continue listening to a particular genre of music.

Figure 8:
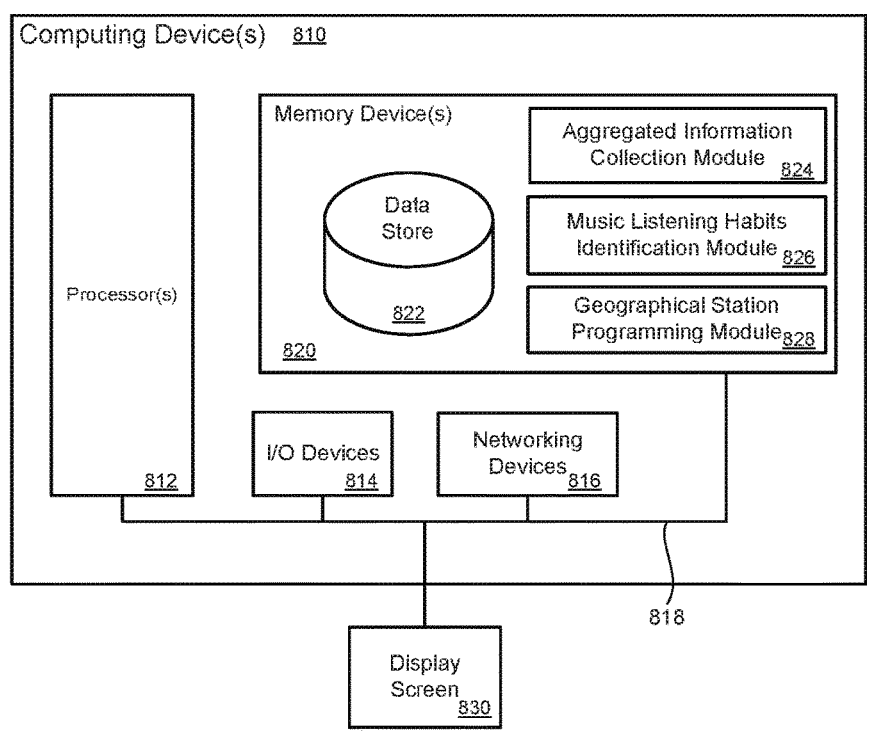
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules that are executable by the processor(s) 812 and data for the modules. Located in the memory device 820 are modules executable by the processor. For example, an aggregated information collection module 824, a music listening habits identification module 826, a geographical station programming module 828, and other modules may be located in the memory device 820. The modules may execute the functions described earlier. A data store 822 may also be located in the memory device 820 for storing data related to the modules and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen 830 that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for generating music playlists tailored to a geographical region, the method comprising:
under control of one or more computer systems configured with executable instructions:
collecting aggregated music behavior information regarding music-related listening behaviors performed in the geographical region;
identifying collective music listening habits for the geographical region using the aggregated music behavior information;
generating geographical station programming for at least one category of music, the geographical station programming including a playlist of music corresponding to the collective music listening habits for the geographical region in the category of music;
providing the geographical station programming to a radio transmitter for transmission over amplitude modulation (AM) radio channels or frequency modulation (FM) radio channels using a terrestrial radio station; and
providing an announcement to switch to a second terrestrial radio channel when a device receiving the geographical station programming approaches an adjacent geographical region.

2. The method of claim 1, further comprising providing the geographical station programming over AM or FM radio channels to be received at a radio receiver coupled to a vehicle.

3. The method of claim 1, further comprising providing the geographical station programming to a transceiver for communication to a mobile computing device over a cellular network.

4. The method of claim 1, wherein the aggregated music behavior information includes electronic music purchases and music listened to by users via internet that are located within the geographical region.

5. A computer-implemented method, the method comprising:

under control of one or more computer systems configured with executable instructions:

identifying collective music listening habits for a geographical region;

categorizing the collective music listening habits for the geographical region into one or more categories of music;

generating geographical station programming according to at least one of the categories of music, the geographical station programming including a music playlist that corresponds to the collective music listening habits for the geographical region;

providing the geographical station programming over a terrestrial radio channel that is an amplitude modulation (AM) radio channel or a frequency modulation (FM) radio channel; and providing an announcement to switch to a second terrestrial radio channel when a device receiving the geographical station programming approaches an adjacent geographical region.

6. The method of claim 5, further comprising providing the geographical station programming over an AM or FM radio channel to be received at a radio receiver coupled to a vehicle.

7. The method of claim 5, further comprising providing the geographical station programming over a cellular network.

8. The method of claim 5, further comprising providing geographical station programming to a mobile device over a cellular network, the mobile device being capable of retransmitting music included in the geographical station programming to a vehicle.

9. The method of claim 5, further comprising identifying the collective music listening habits for the geographical region based on aggregated information about music items purchased or listened to at an electronic site by users located within the geographical region.

10. The method of claim 5, further comprising offering the music included in the geographical station programming for purchase upon a user logging into a user account and selecting the geographical region associated with the user.

11. The method of claim 5, further comprising providing information about the music included in the geographical station programming upon a user selecting the geographical region associated with the user.

12. The method of claim 5, further comprising providing targeted advertisements with the geographical station programming based on the collective music listening habits for the geographical region.

13. The method of claim 5, further comprising providing personalized advertisements to a mobile device that are personalized for a user based on a viewing history, purchasing history, listening history or account information associated with the user.

14. The method of claim 5, further comprising:

providing the geographical station programming to a vehicle in the geographical region over a first terrestrial radio channel; and providing an announcement for a user to switch to a second terrestrial radio channel when the vehicle approaches an adjacent geographical region, the second terrestrial radio channel providing a same genre of music as the first terrestrial radio channel.

15. The method of claim 5, further comprising varying the music included in the geographical station programming according to a time of day based on the collective music listening habits for the geographical region.

16. A system for generating music playlists tailored to a geographical region, the system comprising:

a processor;

a memory device including a data store to store a plurality of data and instructions that, when executed by the processor, cause the processor to execute:

an aggregated information collection module to collect aggregated music behavior information regarding music-related behaviors performed in the geographical region;

a music listening habits identification module to identify collective music listening habits for the geographical region using the aggregated music behavior information;

a geographical station programming module to generate geographical station programming for at least one category of music, the geographical station programming including a playlist of music according to the collective music listening habits for the geographical region in the category of music; and a music delivery module to provide the geographical station programming to a radio receiver via a terrestrial radio channel that is an amplitude modulation (AM) radio channel or frequency modulation (FM) radio channel, and to provide an announcement to switch to a second terrestrial radio channel when a device receiving the geographical station programming approaches an adjacent geographical region.

17. The system of claim 16, further comprising providing the geographical station programming over an AM or FM radio channel to be received at a radio receiver coupled to a vehicle.

18. The system of claim 16, further comprising a music delivery module to provide the geographical station programming to a mobile computing device over a cellular network.

19. The system of claim 16, wherein the aggregated information on music-related behavior includes electronic music purchases and music listened to via internet by users located within the geographical region.

20. The system of claim 16, wherein the geographical station programming module is further configured to vary the music included in the geographical station programming according to a time of day based on the collective music listening habits for the geographical region.

* * * * *